United States Patent
Shao et al.

(10) Patent No.: US 10,146,938 B2
(45) Date of Patent: Dec. 4, 2018

(54) METHOD, APPARATUS AND VIRTUAL MACHINE FOR DETECTING MALICIOUS PROGRAM

(75) Inventors: Jianlei Shao, Beijing (CN); Heli Tan, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 118 days.

(21) Appl. No.: 14/344,864

(22) PCT Filed: Aug. 24, 2012

(86) PCT No.: PCT/CN2012/080545
§ 371 (c)(1),
(2), (4) Date: Mar. 13, 2014

(87) PCT Pub. No.: WO2013/037261
PCT Pub. Date: Mar. 21, 2013

(65) Prior Publication Data
US 2014/0351935 A1    Nov. 27, 2014

(30) Foreign Application Priority Data
Sep. 14, 2011   (CN) .......................... 2011 1 0272443

(51) Int. Cl.
*G06F 21/00* (2013.01)
*G06F 21/56* (2013.01)
(Continued)

(52) U.S. Cl.
CPC .......... *G06F 21/56* (2013.01); *G06F 9/45533* (2013.01); *G06F 21/566* (2013.01); *G06F 21/575* (2013.01)

(58) Field of Classification Search
CPC ........ G06F 21/51; G06F 21/56; G06F 21/575; G06F 9/45533; G06F 21/566
(Continued)

(56) References Cited

U.S. PATENT DOCUMENTS

| | | | |
|---|---|---|---|
| 8,352,522 B1* | 1/2013 | Cheng | G06F 21/566 707/827 |
| 2003/0135791 A1* | 7/2003 | Natvig | G06F 21/566 714/38.12 |
| 2012/0255017 A1* | 10/2012 | Sallam | G06F 21/575 726/24 |

FOREIGN PATENT DOCUMENTS

| CN | 1314638 A | 9/2001 |
|---|---|---|
| CN | 101154258 A | 4/2008 |

(Continued)

OTHER PUBLICATIONS

Microsoft, "Methods to Detect a Boot-Sector Virus", Last Review: Nov. 16, 2006, https://support.microsoft.com/en-us/kb/82923.*

(Continued)

*Primary Examiner* — Mahfuzur Rahman
(74) *Attorney, Agent, or Firm* — Baker & Hostetler LLP (57) ABSTRACT

A method, an apparatus and a virtual machine for detecting a malicious program(s) are disclosed. The method comprises: setting a virtual memory (301); reading a Master Boot Record (MBR) and storing the MBR in the virtual memory (302); and executing each instruction of the MBR in the virtual memory simulatedly, and detecting whether the virtual memory is modified after executing each instruction (303); if so, a malicious program is found, otherwise, continuing to execute the next instruction simulatedly until completing simulation execution of all instructions of the MBR. The technical solution can find the deformed malicious program(s).

20 Claims, 5 Drawing Sheets

(51) Int. Cl.
*G06F 9/455* (2018.01)
*G06F 21/57* (2013.01)
(58) Field of Classification Search
USPC .......................................................... 726/23
See application file for complete search history.

(56) References Cited

FOREIGN PATENT DOCUMENTS

| | | |
|---|---|---|
| CN | 102004876 A | 4/2011 |
| CN | 102339371 A | 2/2012 |

OTHER PUBLICATIONS

International Patent Application No. PCT/CN2012/080545; International Search Report; dated Nov. 15, 2012; 3 pages.

\* cited by examiner

Fig. 11

METHOD, APPARATUS AND VIRTUAL MACHINE FOR DETECTING MALICIOUS PROGRAM

CROSS-REFERENCE TO RELATED APPLICATIONS

This application is the National Stage of International Application No. PCT/CN2012/080545, filed Aug. 24, 2012, which claims the benefit of Chinese Patent Application No. 201110272443.2, filed Sep. 14, 2011, the disclosures of which are incorporated herein by reference in their entireties.

FIELD OF THE INVENTION

The present invention relates to a field of information security technology, and more particularly to a method, an apparatus and a virtual machine for detecting malicious program(s).

BACKGROUND OF THE INVENTION

Malicious program usually refers to as a program that illegally operates in a computer system without an authorization granted. For example, a computer virus is a kind of malicious programs that operates in a computer system and imperils the security of the computer system.

With the development of computer technology and network technology, various forms of computer viruses emerge. Among the viruses, Rootkit, a kernel-level Trojan virus, is software which is able to hide other programs or processes, and may be a combination of one or more software. Broadly speaking, Rootkit can also be regarded as a technology.

In modern operating systems, an application program can not directly access to hardware but uses hardware by calling an interface provided by an operating system. An operating system manages and dispatches these application programs depending on kernel space. Kernel space consists of four main portions, respectively are: process management (responsible for allocating CPU time), file access (deploying a device into a file system and providing a consistent interface for an upper program calling), security control (responsible for enforcedly defining a specific authority and a separate memory range for each process to avoid conflict between processes), and memory management (responsible for allocation, use, release and recovery of memory resource when a process is operating). The kernel is a data structure. By modifying the data structure of the kernel, the Rootkit technology can hide processes, files, network communications and other relevant information (such as, a registry and a system log which is possibly resulted due to modifications, etc.) of other programs.

Bootkit is a more advanced Rootkits, which could bypass kernel checks and start stealthily by infecting MBR (Master Boot Record). That is to say, Bootkit is a kind of Rootkits based on MBR. It can be considered that, all technologies which may be loaded earlier than the Windows kernel at the time of booting and may achieve the kernel hijack can be refer to as Bootkit, such as subsequent BIOS Rootkit, Vbootkit, SMM Rootkits and so on.

At present, conventional security software for killing all kinds of malicious programs (such as viruses) is mainly based on traditional detection technology of characteristic codes. This is because usually all kinds of malicious programs will run some special instruction codes (i.e. characteristic codes) during operation. By searching the characteristic codes, the malicious programs can be detected. For example, in the detection for Bootkit, since the MBR virus generally has a special nature of residing in an upper memory (i.e., upper address bits in memory), the Bootkit can be detected by searching whether the characteristic codes are in the upper memory.

However, deformations of more and more viruses are occurred, some by junk codes and some by deformation codes. Even now, most viruses are pre-encrypted, and then dynamically decrypted before taking action. Therefore, for these deformed viruses, their instructions are randomly varying while achieving the same effects. These deformed viruses can not be found in accordance with the above method of detecting characteristic codes, thereby bypassing the killing of the conventional security software.

In conclusion, a problem to be solved at present is how to detect deformed malicious programs, especially MBR-based Bootkit viruses or the like.

SUMMARY OF THE INVENTION

In view of the above problems, the present invention is to provide a method, an apparatus, and a virtual machine for detecting malicious program(s), which may be able to overcome or at least partially solve or relieve the above problems.

According to an aspect of the present invention, there is provided a method for detecting malicious program(s), comprising:

setting a virtual memory;

reading a MBR and storing the MBR in the virtual memory; and executing each instruction of the MBR in the virtual memory simulatedly, and detecting whether the virtual memory is modified after executing each instruction, if so, a malicious program is found, otherwise, continuing to execute the next instruction simulatedly until completing simulation execution of all instructions of the MBR.

Preferably, the step of detecting whether the virtual memory is modified comprises: detecting whether the size of the virtual memory is changed, if so, the virtual memory being modified; otherwise, the virtual memory being not modified.

Preferably, before the step of setting a virtual memory, the method further comprises: setting a virtual CPU;

then the step of executing each instruction of the MBR in the virtual memory simulatedly comprising:

executing each instruction of the MBR in the virtual memory by the virtual CPU.

Preferably, the step of setting a virtual CPU comprises: initializing the virtual CPU; the step of setting a virtual memory comprises: initializing a BIOS data area, wherein the BIOS data area is used to store the size of the virtual memory.

Preferably, before the step of executing each instruction of the MBR in the virtual memory simulatedly, the method further comprises:

setting a virtual hard disk;

then the step of executing each instruction of the MBR in the virtual memory simulatedly comprising:

copying the MBR in the virtual memory to the virtual hard disk; and reading the MBR from the virtual hard disk and executing each instruction of the MBR simulatedly.

Preferably, the method further comprises:

disassembling each instruction of the MBR and outputting to display.

According to another aspect of the present invention, there is provided an apparatus for detecting malicious program(s), comprising:

a first setting module, adapted to set a virtual memory;

a reading and storing module, adapted to read a MBR and store the MBR in the virtual memory;

a simulating execution module, adapted to execute each instruction of the MBR in the virtual memory simulatedly; and a detecting module, adapted to detect whether the virtual memory is modified after the simulating execution module completes an execution of each instruction, if so, a malicious program is found; otherwise, triggering the simulating execution module to continue to execute the next instruction simulatedly until completing simulation execution of all instructions of the MBR.

Preferably, the detecting module judges whether the virtual memory is modified by detecting whether the size of the virtual memory is changed, if the size is changed, the virtual memory is modified; otherwise, the virtual memory is not modified.

Preferably, the apparatus further comprises:

a second setting module, adapted to set a virtual CPU, wherein the virtual CPU triggers the execution of the simulating execution module and the detecting module.

Preferably, the apparatus further comprises:

a third setting module, adapted to set a virtual hard disk, and copy the MBR in the virtual memory to the virtual hard disk;

then the simulating execution module reading the MBR from the virtual hard disk and executing each instruction of the MBR simulatedly.

Preferably, the apparatus further comprises:

a disassembling engine, adapted to disassemble each instruction of the MBR and output to display.

According to still another aspect of the present invention, there is provided a virtual machine for detecting malicious program(s), comprising:

a virtual CPU initialization module, adapted to initialize a virtual CPU;

a virtual memory initialization module, adapted to initialize a virtual memory, and read the MBR during the initialization process and then store the MBR in the virtual memory;

the virtual memory, adapted to store the MBR; and the virtual CPU, adapted to execute each instruction of the MBR in the virtual memory simulatedly, and detect whether the virtual memory is modified after executing each instruction, if so, a malicious program is found; otherwise, continue to execute the next instruction simulatedly until completing simulation execution of all instructions of the MBR.

Preferably, the virtual machine further comprises:

a virtual hard disk initialization module, adapted to initialize a virtual hard disk, and copy the MBR in the virtual memory to the virtual hard disk during the initialization, wherein the virtual CPU reads the MBR from the virtual hard disk and executes the MBR simulatedly;

the virtual hard disk, adapted to store the MBR copied.

Preferably, the virtual machine further comprises:

a disassembling engine, adapted to disassemble each instruction of the MBR and output to display.

According to still another aspect of the present invention, there is provided a computer program, comprising computer readable codes, wherein when the computer readable codes being operated on a server, the server executes the method for detecting malicious program(s) as described in any one of claims 1-6.

According to still another aspect of the present invention, there is provided a computer readable medium, in which the aforementioned computer program is stored.

The beneficial effects of the present invention are as follows:

Firstly, in the present application, after powering on and before loading operating system files, by a simulated means, the MBR read is stored in a set-up virtual memory firstly, and then loading execution process of the MBR is implemented simulatedly and detects whether the virtual memory is modified after executing each instruction of the MBR simulatedly, if so, a malicious program is found, otherwise, continues to execute the next instruction simulatedly until completing simulation execution of all instructions of the MBR.

In real circumstance, even if the malicious programs such as the MBR-based Bootkit viruses or the like are deformed, they must reside in the upper memory of the system so as to modify the upper memory. Therefore, the above detection method of setting the virtual memory to simulate the upper memory and checking whether the virtual memory is modified, can find suspicious malicious programs without paying attention to any characteristic code transformation technology, as long as the occurrence of this behaviour in actual operation is detected. To a large extent, the detection method can detect the past, current and prospective MBR-based Bootkit.

Secondly, the present application also implements a virtual machine. The virtual machine, by implementing the virtual CPU, the virtual memory, the disassembling engine, the virtual hard disk as well as other related portions, such as virtual BIOS (Basic Input Output System), virtual I/O devices, and etc., can simulate a real loading execution procedure of the MBR and detect the presence of malicious programs such as the Bootkit and so on. Moreover, the virtual machine may be used not only as a separate tool, but as dynamic library called by other programs, so as to be flexible to use. At the same time, taking the practical aspects such as performance and efficiency into account, the implemented virtual machine as a whole can be controlled within a few hundred of K bytes and be considered as a lightweight virtual machine.

Of course, any of products implementing the solutions of the present application do not necessarily need to simultaneously achieve all of the advantages described above.

The above description is merely an overview of the technical solutions of the present invention. In order to understand the technical means of the present invention more clearly, implement in accordance with the content of the specification and make above and other objects, features and advantages of the present invention more apparent, there are provided detailed embodiments of the present invention hereafter.

BRIEF DESCRIPTION OF THE DRAWINGS

Various other advantages and benefits will become apparent to the person skilled in the art by reading the detailed description of the preferred embodiments hereinafter. The accompanied drawings are only for the purpose of illustrating the preferred embodiments, while not considered as limiting the present invention. Moreover, the same parts are denoted by the same reference symbols throughout the drawings. In the accompanied drawings.

DETAILED DESCRIPTION OF THE EMBODIMENTS

The present invention will be further described below in conjunction with the accompanying drawings and specific embodiments.

The present invention provides a method for detecting malicious program(s), especially the malicious program(s) such as the MBR-based Bootkit or the like, in which the malicious programs, no matter how they are deformed, can be detected.

The thought of the present application will be first introduced as follows:

Under normal circumstances, a booting process of a computer system is as the following:

Self-testing after power-on→booting from a floppy disk, a hard disk or a CD-ROM by a motherboard BIOS in accordance with user-specified boot sequence→reading a MBR into a memory by a system BIOS→handing over the right of domination to a master boot program→checking status of a partition table and searching active partition(s) by the master boot program→handing over the right of domination to the boot record(s) of the active partition(s) by the master boot program, and loading the operating system start-up files by the boot record(s).

It can be seen from the above, the MBR is a first-read position after a computer is powered on and the board of the computer is self-tested. The MBR is located in sector 1, track 0, head 0 of a hard disk with a size of 512 bytes, and does not belong to any one operating system nor can be read by a disk operation command provided by the operating system.

In DOS age, the extremely popular boot sector viruses are parasitic in MBR. Taking the Ghosting virus as an example, the Ghosting virus is parasitic in an MBR, and the driver released by the Ghosting virus can destroy the most security tools and system auxiliary tools. When the system is rebooted, the Ghosting virus can firstly load earlier than the operating system kernel. Further, after the Ghosting virus is successfully running, any abnormality can not be found in processes and system start-up add-ins. Even in the case of format and reinstallation of the system, the Ghosting virus can not be cleaned up.

Figure 1:
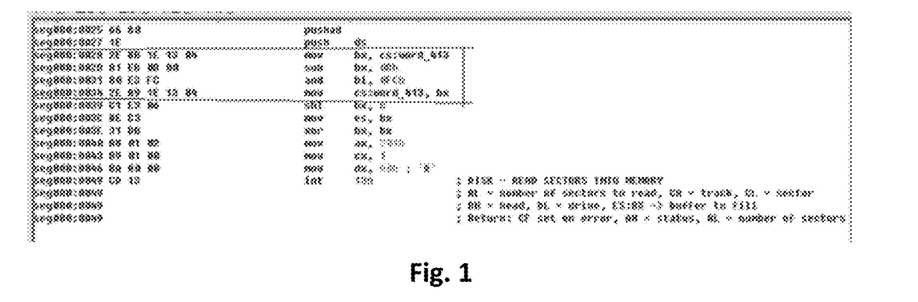
FIG. 1 is a schematic view showing codes of the Ghosting 3 in prior art.

Since the Ghosting virus resides in an upper memory of the system, the presence of the Ghosting virus can be determined by searching the upper memory for the characteristic codes in prior art. For example, in the codes of the Ghosting 3 as shown in FIG. 1, whether to modify the upper memory to reside in virus is detected by searching for the characteristic code 0X0413. For the deformed Ghosting codes, with reference to FIG. 2 in which a variant of the Ghosting codes is shown, the codes also may modify the upper memory to achieve as the same effect as that in FIG. 1, but it may bypass the killing of conventional security software(s) by transforming instructions such that its characteristic codes can not be found.

Figure 2:
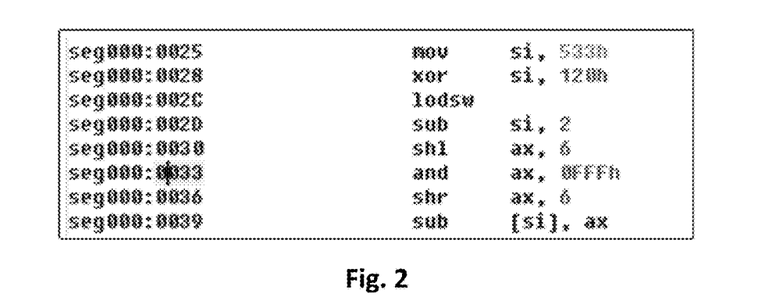
FIG. 2 is a schematic view showing deformed codes of the Ghosting in prior art.

Upon the careful analysis of the Ghosting virus as shown in FIGS. 1 and 2, it could be appreciated that, regardless of the deformation, the virus is able to achieve the effect of modifying the upper memory as long as the virus runs. Accordingly, various forms of the Ghosting virus can be detected by detecting the upper memory. In order to make use of this point, the present application sets a virtual memory to simulate the upper memory and simulates the loading and execution process of the MBR to detect the virtual memory, thereby finding out varied malicious programs such as the MBR-based Bootkit (such as the Ghosting virus) or the like before the malicious programs actually run.

The implementation process of the methods of the present application will be described in detail by the embodiments hereinafter.

Figure 3:
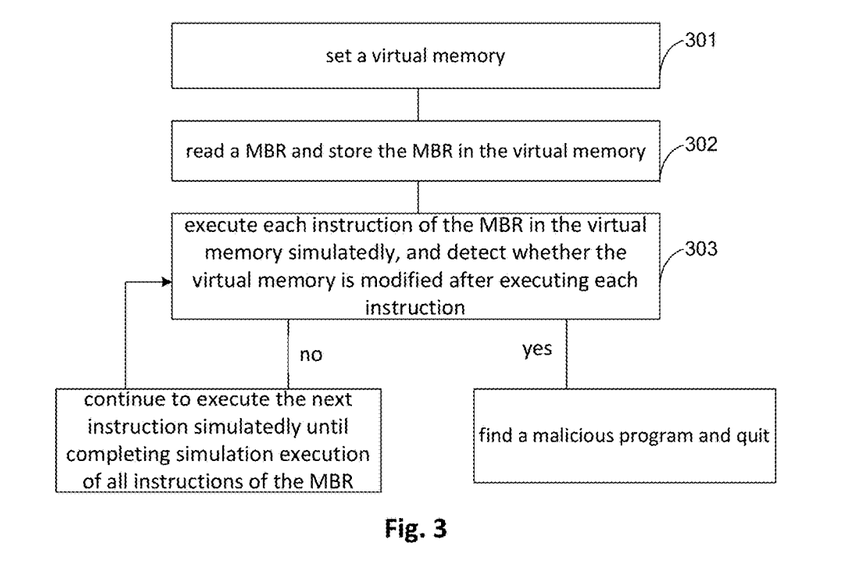
FIG. 3 is a flowchart schematically illustrating a method for detecting malicious program(s) according to an embodiment of the present invention.

Referring to FIG. 3, a flowchart of a method for detecting malicious program(s) according to an embodiment of the present invention is showed.

Referring to the computer system boot processes as described above, after the computer system is powered on and before the operating system files are loaded, the following steps may be performed:

At step 301, set a virtual memory.

That is to allocate an area of memory as a virtual memory, and the virtual memory is used to simulate the actual upper memory of a system.

At step 302, read a master boot record (MBR) and store the MBR in the virtual memory.

In the actual boot processes, after a power-on self-test, a system BIOS reads the MBR into the actual upper memory; while in the present embodiment, the MBR is read into the virtual memory.

At step 303, execute each instruction of the MBR in the virtual memory simulatedly, and detect whether the virtual memory is modified after executing each instruction.

If the virtual memory is modified, then malicious program (s) is found and the detecting process is quit and a prompt is provided; otherwise, if the virtual memory is not modified, then continue to execute the next instruction simulatedly until completing simulation execution of all instructions of the MBR, and then quit the detecting process. If no malicious program(s) is found after the simulated execution of all the instructions of the MBR is completed, then hand over the right of domination to a boot record of an actual active partition in the system and load the operating system start-up files by the boot record.

Specifically, whether to modify the virtual memory may be determined by detecting whether the size of the virtual memory is changed, if the size is changed, it may be determined that the virtual memory is modified; otherwise, it may be determined that the virtual memory is not modified. In current practical applications, the Bootkit may modify the memory to make the memory space become smaller, so that after executing each instruction simulatedly, the detection can be performed by determining whether the virtual memory becomes smaller. As a matter of course, the embodiment does not rule out other methods of determining the modification to the memory.

Furthermore, in an embodiment of the present invention, the step 303 may be implemented by a virtual CPU. Specifically, before setting the virtual memory at the step 301, a virtual CPU may be set firstly, then at the step 303, the execution of instructions may be simulated and the virtual memory may be detected by the virtual CPU.

The contents based on above embodiment shown in FIG. 3:

Further optionally, after setting the virtual memory, a virtual hard disk may be additionally set, and the MBR in the virtual memory may be copied to the virtual hard disk. When executing the instructions of the MBR simulatedly, the instructions may be directly read from the virtual hard disk.

Further optionally, in order for the integrity of the entire simulation process, other related parts such as a virtual BIOS and a virtual I/O device may be additionally set for the detection process.

Further optionally, in order to facilitate for relevant personnel to view the execution of the entire simulation process, each instruction of the MBR may be disassembled and output to display.

In summary, in real circumstance, even if the malicious programs such as the MBR-based Bootkit viruses or the like are deformed, they must reside in the upper memory of the system so as to modify the upper memory. Therefore, the above detection method of setting the virtual memory to simulate the upper memory and checking whether the virtual memory is modified, can find suspicious malicious programs without paying attention to any characteristic code transformation technology, as long as the occurrence of this behaviour in actual operation is detected. To a large extent, the detection method can detect the past, current and prospective MBR-based Bootkit.

It should be explained that, for the purpose of a simple description, the method embodiments above have been described as combinations of a series of actions, but the skilled in the art should be aware that the present invention is not limited by the sequence of actions as described. According to the present invention, some of the steps can be performed in other sequences or simultaneously. Secondly, the skilled in the art also should be aware that each embodiments described in the specification are exemplary, and related actions may not be necessarily required in the present application.

Based on the embodiments of the detection method above, a corresponding apparatus embodiment is provided by the present application.

Figure 4:
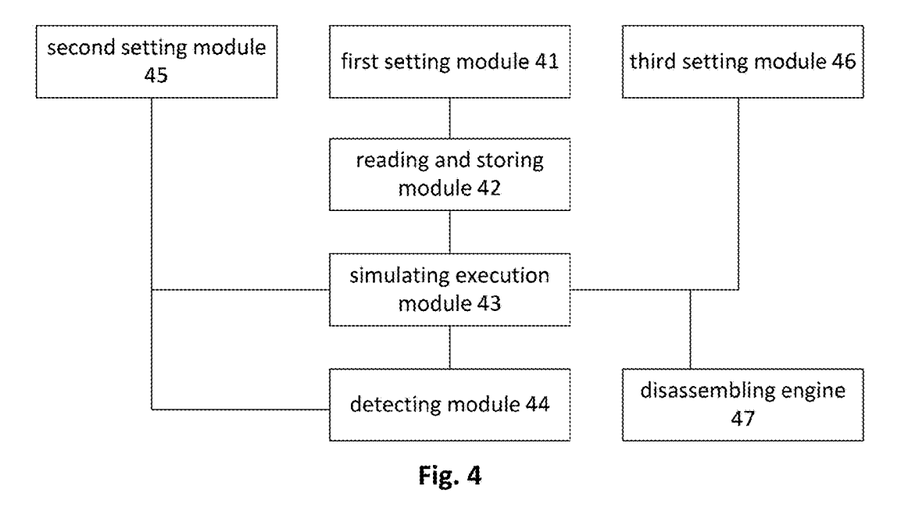
FIG. 4 is a structure diagram schematically illustrating an apparatus for detecting malicious program(s) according to an embodiment of the present invention.

Referring to FIG. 4, it is a structure diagram of an apparatus for detecting malicious program(s) according to an embodiment of the present invention.

The apparatus for detecting malicious program(s) may comprise:

a first setting module 41 that is adapted to set a virtual memory;

a reading and storing module 42 that is adapted to read a MBR and store the MBR in the virtual memory;

a simulating execution module 43 that is adapted to execute each instruction of the MBR in the virtual memory simulatedly; and a detecting module 44 that is adapted to detect whether the virtual memory is modified after the simulating execution module 43 completes an execution of each instruction, if modified, then malicious program(s) is found; otherwise, the simulating execution module 43 is triggered to continue to execute the next instruction simulatedly until completing simulation execution of all instructions of the MBR.

Preferably, the detecting module 44 may judge whether the virtual memory is modified by detecting whether the size of the virtual memory is changed, if the size is changed, it may be determined that the virtual memory is modified; otherwise, it may be determined that the virtual memory is not modified.

Further optionally, the apparatus may further comprise:

a second setting module 45 that is adapted to set a virtual CPU which may trigger the execution of the simulating execution module 43 and the detecting module 44.

Further optionally, the apparatus may further comprise:

a third setting module 46 that is adapted to set a virtual hard disk and copy the MBR in the virtual memory to the virtual hard disk;

At this point, the simulating execution module 43 may read the MBR from the virtual hard disk and execute each instruction of the MBR simulatedly.

Further optionally, the apparatus may further comprise:

a disassembling engine 47 that is adapted to disassemble each instruction of the MBR and output to display.

The apparatus may be used not only as a separate tool, but as dynamic library called by other programs, so as to be flexible to use.

The above-described embodiment of the apparatus for detecting malicious program(s) is substantially similar to the corresponding method(s). Thus the description thereof is relatively simple, and for the relevant parts, reference can be made to the above-mentioned method embodiments.

Based on the above, in order for skilled in the art to better understand the implementation of the present application, the present application also provides another more specific embodiment as follows.

According to an embodiment of the present invention, there is provided a virtual machine, which, by the implementation of a virtual CPU, a virtual memory, a disassembling engine, a virtual hard disk as well as other related parts, such as a virtual BIOS and a virtual I/O device, can simulate the execution and the loading process of the MBR, and detect the presence of the malicious program(s) such as Bootkit.

Figure 5:
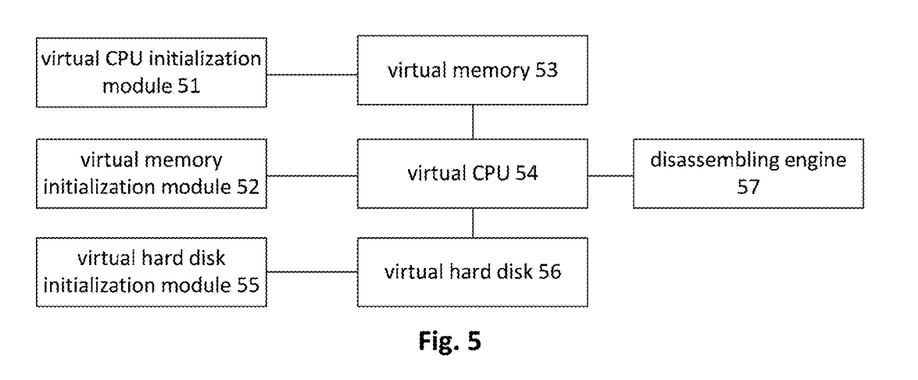
FIG. 5 is a structure diagram schematically illustrating a virtual machine according to an embodiment of the present invention.

Referring to FIG. 5, it is a structure diagram of a virtual machine according to an embodiment of the present invention.

Specifically, the virtual machine may comprise:

a virtual CPU initialization module 51 that is adapted to initialize a virtual CPU 54;

a virtual memory initialization module 52 that is adapted to initialize a virtual memory 53, and read the MBR during the initialization process and then store the MBR in the virtual memory 53;

the virtual memory 53 that is adapted to store the MBR; and the virtual CPU 54 that is adapted to execute each instruction of the MBR in the virtual memory 53 simulatedly, and detect whether the virtual memory is modified after executing each instruction, if modified, then malicious program(s) is found; otherwise, continue to execute the next instruction simulatedly until completing simulation execution of all instructions of the MBR.

Further optionally, the virtual machine may additionally comprise:

a virtual hard disk initialization module 55 that is adapted to initialize a virtual hard disk 56, and copy the MBR in the virtual memory 53 to the virtual hard disk 56 during the initialization, wherein the virtual CPU 54 reads the MBR from the virtual hard disk 56 and executes the MBR simulatedly;

the virtual hard disk 56 that is adapted to store the MBR copied.

Further optionally, the virtual machine may further comprise:

a disassembling engine 57 that is adapted to disassemble each instruction of the MBR and output to display.

In the practical application, the Bootkit virus runs in the real mode of the computer system, so the virtual machine under the real mode will be taken as an example to describe in detail hereinafter. As a matter of course, the virtual machine can be applied to the protection mode or other computer mode, and the present embodiment is not limited thereby.

In the real mode, the virtual CPU can simulate the implementation of all instructions under the real mode, wherein the instructions mainly refer to 8086 instructions and may also include those instructions after 386. In addition, with the development of the Bootkit technology, such as Trojan and etc., if the Trojan called a special instruction, the virtual CPU can also simulate the corresponding special instruction. For example, in the case where the Ghosting virus employs RDTSC instruction that starts to be supported after 586 in order to prevent being debugged, the virtual CPU may also simulate the RDTSC instruction.

After the power-on self-test, the system BIOS reads the MBR built-in the system and then, while the virtual machine is initializing, transmits the MBR to the virtual machine. The execution of the virtual machine may comprise the following steps:

At step 1, initialize the virtual CPU.

The virtual CPU may be initialized firstly, wherein the virtual CPU is 80×86 with a single core and the register supported thereby is the same as that in the real machine.

In addition, the virtual machine supports initialization of instructions. There is an instruction support list inside the virtual machine, to which the instructions required to be supported may be increasingly added as according to actually required. The list of supported instructions may be filled during the initialization. Then, CPU instruction pointer in the virtual machine may be pointed to a place 0xf000: 0xfff0 where the BIOS instruction (i.e., MBR instruction) in the virtual memory starts.

At step 2, initialize the virtual memory.

The step may be implemented by initializing the BIOS data area, wherein the BIOS data area may retain the size of regular virtual memory. In the real mode, about 640 KB of memory space can be allocated as the virtual memory. Then, the MBR read by the system BIOS may be stored in the virtual memory.

At step 3, initialize the virtual hard disk and the relevant parts of the virtual machine.

Generally, only 1 MB of disk is used under DOS, thus the actual hard disk may be simulated by allocating about 1 MB of memory space as a virtual hard disk. Accordingly, the access to the actual hard disk may be simulated by accessing to the virtual hard disk. Then, the MBR in the virtual memory may be copied to the beginning of the virtual disk.

In addition, the other relevant parts of the virtual machine, such as the virtual BIOS, the virtual I/O device and the like, may be initialized.

At Step 4, run the virtual CPU.

Similar to the actual execution processes, the execution may start from the beginning of the execution of the BIOS instructions (i.e. the MBR instructions) after the virtual CPU runs. The virtual CPU may perform instruction decoding for each executed instruction of the MBR, and modify the internal registers and the relevant memory according to the result of the instruction decoding to perform the corresponding procedures. If the instruction contains a virus, the virtual CPU will not only modify the internal registers but the relevant virtual memory; if the instruction does not contain a virus, the virtual CPU will not modify the relevant virtual memory.

At step 5, the virtual CPU detects the virtual memory.

Upon the execution of each instruction, the virtual CPU may detect the size of the virtual memory retained by the previously set BIOS data area, if the size is changed, it may be considered that the suspicious MBR virus is found, then the virtual machine is quit and a prompt is provided. Otherwise, continue the execution. If it executes to CS=0, IP=0x7C00, then detect whether to execute to the operating system boot sector, such as the boot sector of NTFS file system or FAT file system. If yes, it may be considered that the execution of the MBR is finished with no suspicious MBR found, then exit.

It should be noted that the sequence of the steps above can be adjusted according to actual needs. The present application is not limited by the sequence of actions as described. According to the present application, some of the steps may be performed in other sequences or simultaneously.

The above virtual machine may be used not only as a separate tool, but as dynamic library called by other programs, so as to be flexible to use. At the same time, taking the practical aspects such as performance and efficiency into account, the implemented virtual machine as a whole can be controlled within a few hundred of K bytes and be considered as a lightweight virtual machine.

Hereinafter, the Ghosting virus will be taken as an example to illustrate the content as set forth above according to the present application.

Figure 6:
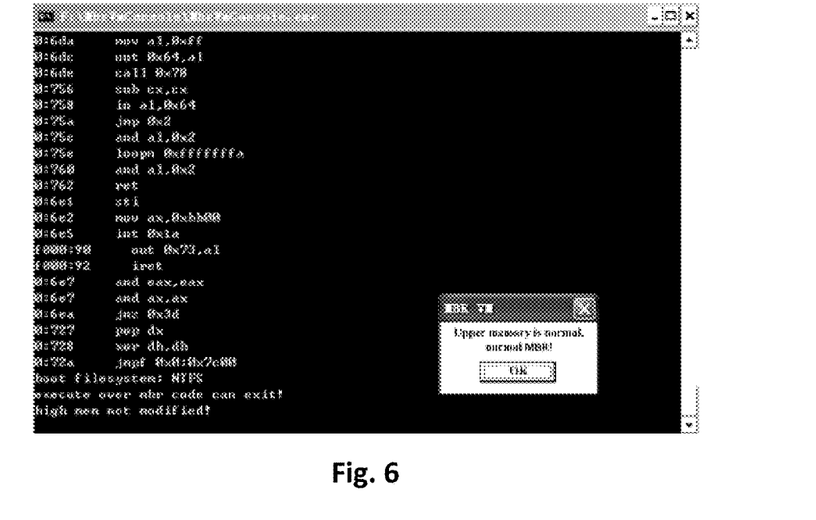
FIG. 6 is a schematic view of a display result after a normal MBR is operated according to an embodiment of the present invention.

Referring to FIG. 6, it is a schematic view of a display result after a normal MBR is operated according to an embodiment of the present invention.

Figure 7:
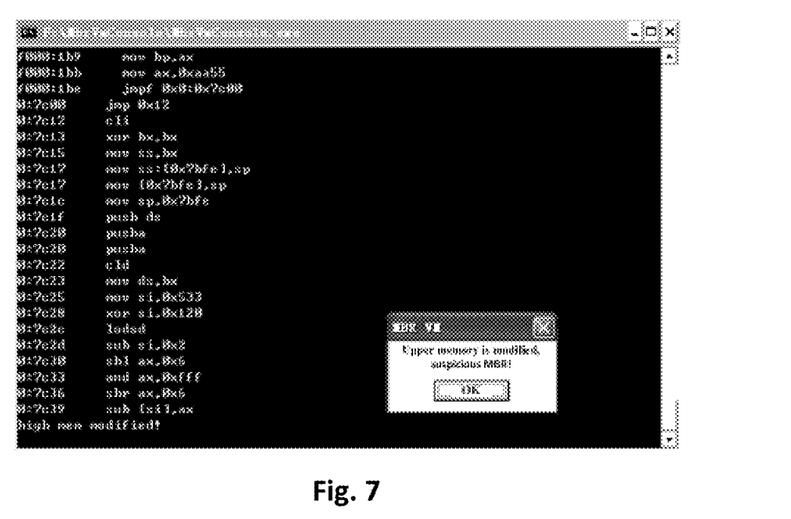
FIG. 7 is a schematic view of a display result after an MBR infected with the Ghosting 1 is operated according to an embodiment of the present invention.

Referring to FIG. 7, it is a schematic view of a display result after an MBR infected with the Ghosting 1 is operated according to an embodiment of the present invention.

Figure 8:
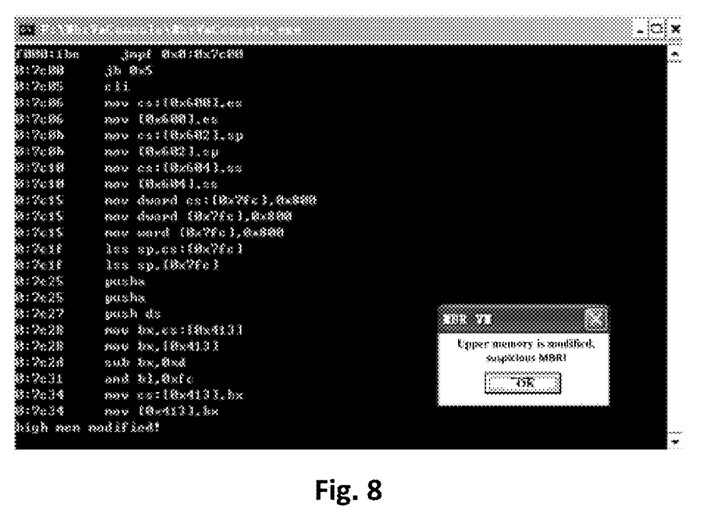
FIG. 8 is a schematic view of a display result after an MBR infected with the Ghosting 3 is operated according to an embodiment of the present invention.

Referring to FIG. 8, it is a schematic view of a display result after an MBR infected with the Ghosting 3 is operated according to an embodiment of the present invention.

Figure 9:
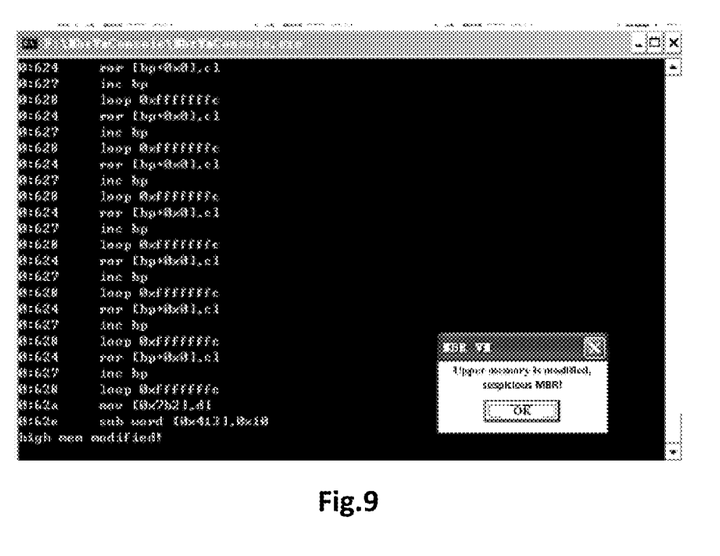
FIG. 9 is a schematic view of a display result after an MBR infected with a top-level Bootkit is operated according to an embodiment of the present invention.

Referring to FIG. 9, it is a schematic view of a display result after an MBR infected with a top-level Bootkit is operated according to an embodiment of the present invention.

Herein,

MbrVmConsole is a main program;

MbrVM.ini is a configuration file, which is used to specify the size of VM memory and file(s) of the virtual hard disk;

Mbr.img is the specified virtual hard disk file;

Which follow the BIOS are virtual BIOS files used by the virtual machine.

In use, copy the specified MBR DUMP file mbr.bin to the directory of the virtual machine and run the MbrVmconsole, then the virtual machine is run to start detection.

mbrGood.bin is a normal MBR;
mbrguiyingl.bin is the MBR of the Ghosting 1;
mbrguiying3.bin is the MBR of the Ghosting 3;
mbrTdl.bin is TDL4 MBR.

In operation, rename the corresponding file to mbr.bin to perform the corresponding detection.

In summary, as the anti-virus software technology has become more sophisticated, the Trojan-like virus is more and more difficult to survive. The traditional Trojan technology has been difficult to survive and develop. Emergence of the Bootkit technology, however, makes the viruses remain even better. This technology may load up a complete virus execution system simply by writing load codes in the MBR, without document, process and modification to registry which can be detected by any anti-virus software. Moreover, even in the case of format and reinstallation, it still can be resurrected. Therefore, the methods and the apparatus based on the application may play a decisive role in the future in the detection of this Trojan virus, which is almost a blind spot of all the current anti-virus software.

Each of members according to the embodiments of the present invention can be implemented by hardware, or implemented by software modules operating on one or more processors, or implemented by the combination thereof. The person skilled in the art should understand that, in practice, a microprocessor or a digital signal processor (DSP) may be used to realize some or all of the functions of some or all of the members of the apparatus for detecting the malicious program(s) and the virtual machine according to the embodiments of the present invention. The present invention may further be implemented as equipments or apparatus programs (for example, computer programs and computer program products) for executing some or all of the methods as described herein. The programs for implementing the present invention may be stored in a computer readable medium, or have a form of one or more signal. Such a signal may be downloaded from the Internet websites, or be provided in carrier signal, or be provided in other manners.

Figure 10:
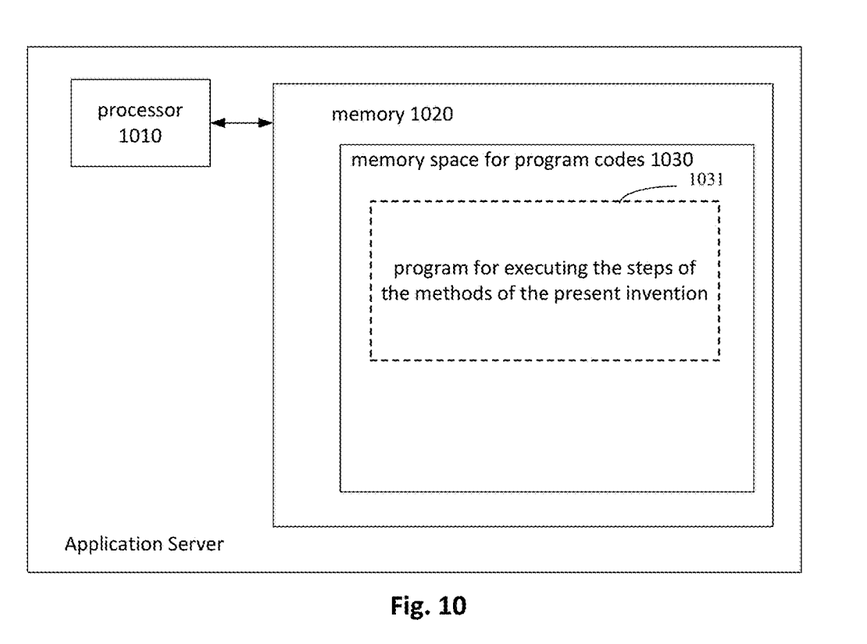
FIG. 10 is a block diagram schematically illustrating a server for executing the methods according to the present invention.
Figure 11:
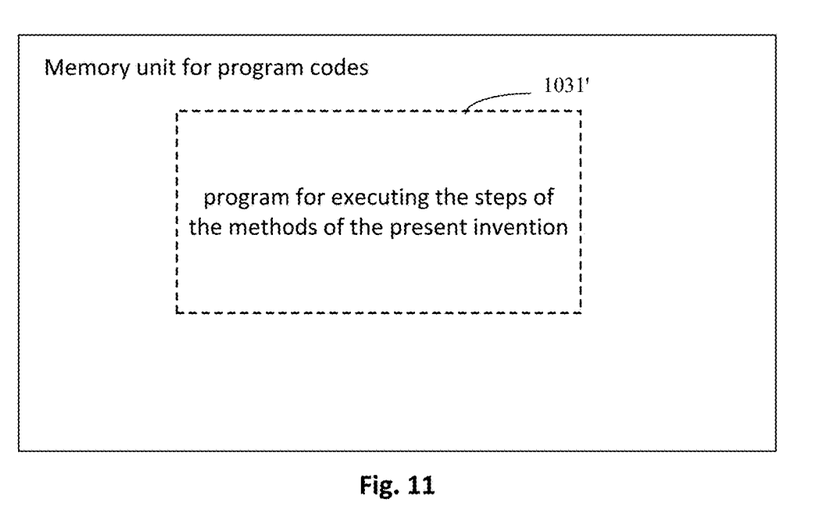
FIG. 11 schematically illustrates a memory unit for storing or carrying program codes for executing the methods according to the present invention.

For example, FIG. 10 schematically shows a server for executing the methods for detecting malicious program(s) according to the present invention, for example, an application server. Traditionally, the server comprises a processor 1010 and a computer program product or a computer readable medium in form of a memory 1020. The memory 1020 may be electronic memories such as flash memory, EEPROM (Electrically Erasable Programmable Read—Only Memory), EPROM, hard disk or ROM. The memory 1020 has a memory space 1030 for executing program codes 1031 of any steps of the above methods. For example, the memory space 1030 for program codes may comprise respective program codes 1031 used to implement the various steps in the above mentioned methods. These program codes may be read from and/or be written into one or more computer program products. These computer program products comprise program code carriers such as hard disk, compact disk (CD), memory card or floppy disk. These computer program products are usually the portable or stable memory unit as shown in reference FIG. 11. The memory unit may be provided with memory sections, memory spaces, etc., similar to the memory 1020 of the server as shown in FIG. 10. The program codes may be compressed in an appropriate form. Usually, the memory unit includes computer readable computer codes 1031' which can be read by processors such as 1010. When these codes are operated on the server, the server may execute each step as described in the above methods.

The terms "one embodiment", "an embodiment" or "one or more embodiment" used herein means that, the particular feature, structure, or characteristic described in combination with the embodiments may be included in at least one embodiment of the present invention. In addition, it should be noticed that, the word "in one embodiment" used herein is not necessarily always referring to the same embodiment.

A number of specific details have been described in the specification provided herein. However, it is possible to be understood that the embodiments of the present invention may be practiced without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of the claims as appended. In the claims, any reference symbols between brackets should not form a limit of the claims. The word "comprising/comprise" does not exclude the presence of elements or steps not listed in a claim. The word "a" or "an" in front of element does not exclude the presence of a plurality of such elements. The present invention may be achieved by means of hardware comprising a number of different components and by means of a suitably programmed computer. In the unit claim listing a plurality of apparatuses, some of these apparatuses may be implemented by the same hardware. The words "first", "second", and "third", etc. do not denote any order. These words can be interpreted as a name.

Additionally, it should also be noticed that the language used in the present specification is chosen for the purpose of readability and teaching, rather than selected in order to explain or define the subject matter of the present invention. Therefore, it is obvious for an ordinary person skilled in the art that many modifications and variations could be made without departing from the scope and spirit of the claims as appended. For the scope of the present invention, the disclosure of the present invention is illustrative but not restrictive, and the scope of the present invention is defined by the appended claims.

The invention claimed is:

1. A method for detecting at least a malicious program, comprising:
setting a predetermined size of a virtual memory to simulates an upper memory area and initializing the virtual memory, wherein the initializing the virtual memory further comprises initializing a BIOS data area, the BIOS data area storing the predetermined size of the virtual memory;
reading a Master Boot Record, MBR, and storing the MBR into the virtual memory;
executing each instruction of the MBR stored in the virtual memory and detecting whether the predetermined size of the virtual memory is changed after executing the each instruction;
determining that a malicious program is found when detecting that the predetermined size of the virtual memory is changed;
when detecting that the predetermined size of the virtual memory is not changed, continuing to execute a next instruction of the MBR stored in the virtual memory until completing simulation execution of all instructions of the MBR stored in the virtual memory.

2. The method according to claim 1, wherein the detecting whether the size of the virtual memory is changed further comprises:
   detecting whether the size of the virtual memory becomes smaller.
3. The method according to claim 1, before the setting a virtual memory, further comprising:
   setting a virtual CPU; and
   the executing each instruction of the MBR in the virtual memory further comprises executing each instruction of the MBR in the virtual memory by the virtual CPU.
4. The method according to claim 3, wherein,
   the setting a virtual CPU comprises: initializing the virtual CPU.
5. The method according to claim 1, before the executing each instruction of the MBR in the virtual memory, further comprising:
   setting a virtual hard disk; and
   executing each instruction of the MBR in the virtual memory comprises:
      copying the MBR in the virtual memory to the virtual hard disk; and
      reading the MBR from the virtual hard disk and executing each instruction of the MBR.
6. The method according to claim 1, further comprising:
   disassembling each instruction of the MBR and outputting to display.
7. The method according to claim 2, before the setting a virtual memory, further comprising:
   setting a virtual CPU; and
   then the executing each instruction of the MBR in the virtual memory further comprising:
      executing each instruction of the MBR in the virtual memory by the virtual CPU.
8. The method according to claim 7, wherein,
   the setting a virtual CPU comprises: initializing the virtual CPU.
9. The method according to claim 2, wherein, before the executing each instruction of the MBR in the virtual memory, further comprising:
   setting a virtual hard disk;
   then the executing each instruction of the MBR in the virtual memory further comprising:
      copying the MBR in the virtual memory to the virtual hard disk; and
      reading the MBR from the virtual hard disk and executing each instruction of the MBR.
10. An apparatus for detecting at least a malicious program, comprising:
    a processor; and
    a memory communicatively coupled to the processor, the memory configured to comprise:
       a first setting module, when executed by the processor, configured to set a predetermined size of a virtual memory to simulates an upper memory area and initialize the virtual memory, wherein initializing the virtual memory further comprises initializing a BIOS data area, the BIOS data area storing the predetermined size of the virtual memory;
       a reading and storing module, when executed by the processor, configured to read a Master Boot Record, MBR, and store the MBR into the virtual memory;
       a simulating execution module, when executed by the processor, configured to execute each instruction of the MBR stored in the virtual memory; and
       a detecting module, when executed by the processor, configured to detect whether the predetermined size of the virtual memory is changed after the simulating execution module completes an execution of the each instruction, and determine that a malicious program is found when detecting that the predetermined size of the virtual memory is changed;
       when detecting that the predetermined size of the virtual memory is not changed, triggering the simulating execution module to continue to execute a next instruction of the MBR stored in the virtual memory until completing simulation execution of all instructions of the MBR stored in the virtual memory.
11. The apparatus according to claim 10, wherein the detecting module configured to detect whether the size of the virtual memory is changed is further configured to detect whether the size of the virtual memory becomes smaller.
12. The apparatus according to claim 10, further comprising:
    a second setting module, when executed by the processor, configured to set a virtual CPU, wherein the virtual CPU triggers the execution of the simulating execution module and the detecting module.
13. The apparatus according to claim 10, further comprising:
    a third setting module, when executed by the processor, configured to set a virtual hard disk, and copy the MBR in the virtual memory to the virtual hard disk;
    then the simulating execution module reading the MBR from the virtual hard disk and executing each instruction of the MBR.
14. The apparatus according to claim 11, further comprising:
    a disassembling engine, when executed by the processor, configured to disassemble each instruction of the MBR and output to display.
15. The apparatus according to claim 11, the memory further configured to comprise:
    a second setting module, configured to set a virtual CPU, wherein the virtual CPU triggers the execution of the simulating execution module and the detecting module.
16. The apparatus according to claim 11, the memory further configured to comprise:
    a third setting module, configured to set a virtual hard disk, and copy the MBR in the virtual memory to the virtual hard disk;
    then the simulating execution module reading the MBR from the virtual hard disk and executing each instruction of the MBR.
17. A non-transitory computer-readable storage medium bearing computer-readable instructions that, when executed on a computing device, cause the computing device at least to:
    initialize a virtual CPU;
    initialize a virtual memory, set a predetermined size of the virtual memory to simulates an upper memory area, and read a Master Boot Record (MBR) during the initialization process, wherein initializing the virtual memory further comprises initializing a BIOS data area, the BIOS data area storing the predetermined size of the virtual memory;
    store the MBR into the virtual memory; and
    execute each instruction of the MBR stored in the virtual memory, and detect whether the size of the virtual memory is changed after executing the each instruction;
    determine that a malicious program is found when detecting that the predetermined size of the virtual memory is changed;

when detecting that the predetermined size of the virtual memory is not changed, continue to execute a next instruction of the MBR stored in the virtual memory until completing simulation execution of all instructions of the MBR stored in the virtual memory.

18. The non-transitory computer-readable storage medium according to claim 17, further comprising computer-executable instructions that upon execution on a computing device cause the computing device to at least:
   initialize a virtual hard disk, and copy the MBR in the virtual memory to the virtual hard disk during the initialization, wherein the virtual CPU reads the MBR from the virtual hard disk and executes each instruction of the MBR;
   store the MBR copied.

19. The non-transitory computer-readable storage medium according to claim 17, further comprising computer-executable instructions that upon execution on a computing device cause the computing device to at least:
   disassemble each instruction of the MBR and output to display.

20. The non-transitory computer-readable storage medium according to claim 18, further comprising computer-executable instructions that upon execution on a computing device cause the computing device to at least:
   disassemble each instruction of the MBR and output to display.

* * * * *